United States Patent [19]

Ness

[11] Patent Number: 4,856,759
[45] Date of Patent: Aug. 15, 1989

[54] WOODY PLANT EXTRACTOR

[76] Inventor: Thomas O. Ness, 3435 Army St. #330, San Francisco, Calif. 94110

[21] Appl. No.: 331,444

[22] Filed: Mar. 31, 1989

[51] Int. Cl.$^4$ .............................................. A01B 1/18
[52] U.S. Cl. ................................... 254/132; 294/50.9
[58] Field of Search .................. 172/371; 254/132, 30, 254/131; 37/2 R; 294/50.6, 50.9

[56] References Cited

U.S. PATENT DOCUMENTS

| | | | |
|---|---|---|---|
| 287,677 | 4/1883 | Higinbotham et al. | |
| 332,169 | 2/1885 | Stocking | 294/50.9 |
| 441,864 | 12/1890 | Black | 254/132 |
| 779,984 | 11/1905 | Allen | |
| 935,020 | 9/1909 | Harvey | 254/132 |
| 941,644 | 9/1909 | Miller | |
| 1,452,205 | 4/1923 | Madsen | 254/132 |
| 1,758,526 | 4/1930 | Lewis | 294/50.9 |
| 2,604,300 | 7/1952 | Polselli | 254/132 |
| 4,243,206 | 1/1981 | Heikkinen | 254/132 |
| 4,547,010 | 1/1985 | Camp | 294/50.9 |
| 4,642,918 | 2/1987 | Venables | 254/132 |

*Primary Examiner*—Richard J. Johnson

[57] ABSTRACT

A tool for grasping the stem of a woody shrub or small tree and uprooting same comprises an elongated lever arm pivotally attached at two points at its lower end to a lifting assembly having stem-gripping jaws. The lifting assembly includes a lifter arm having a fulcrum means mounted at one end and a fixed jaw face mounted at the other, and a movable jaw that slides parallel to said lifter arm, having a jaw face that opposes said fixed jaw face and moves in parallel relation to it. Dual leverage ratios are attained by the length of the lever arm, the length of the lifter arm, and the distance between said two pivot points, enabling the jaws to grip a woody stem with a force that increases at a greater rate than the lifting force as the operator pulls said lever arm to uproot said shrub or tree.

3 Claims, 3 Drawing Sheets

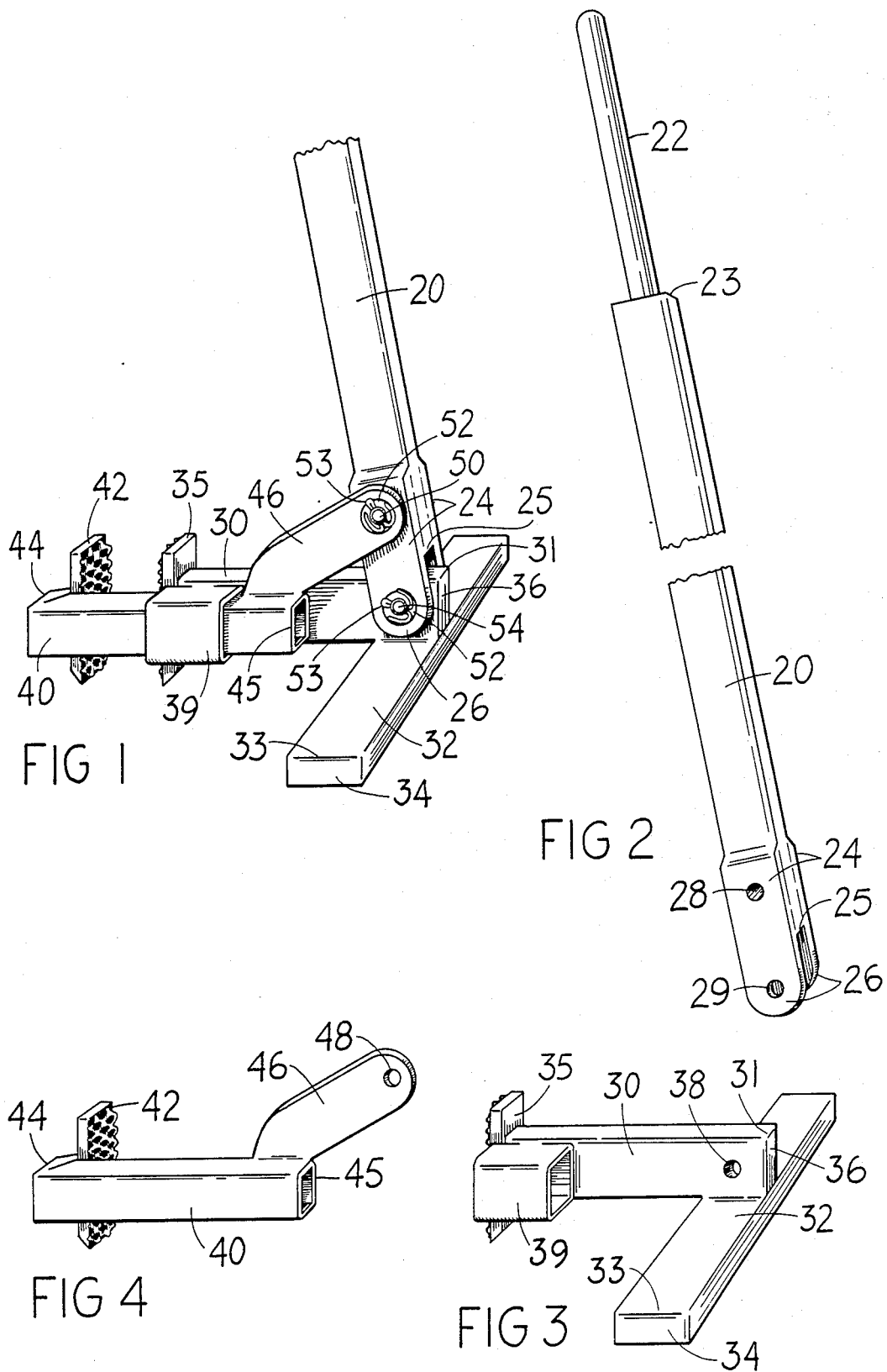

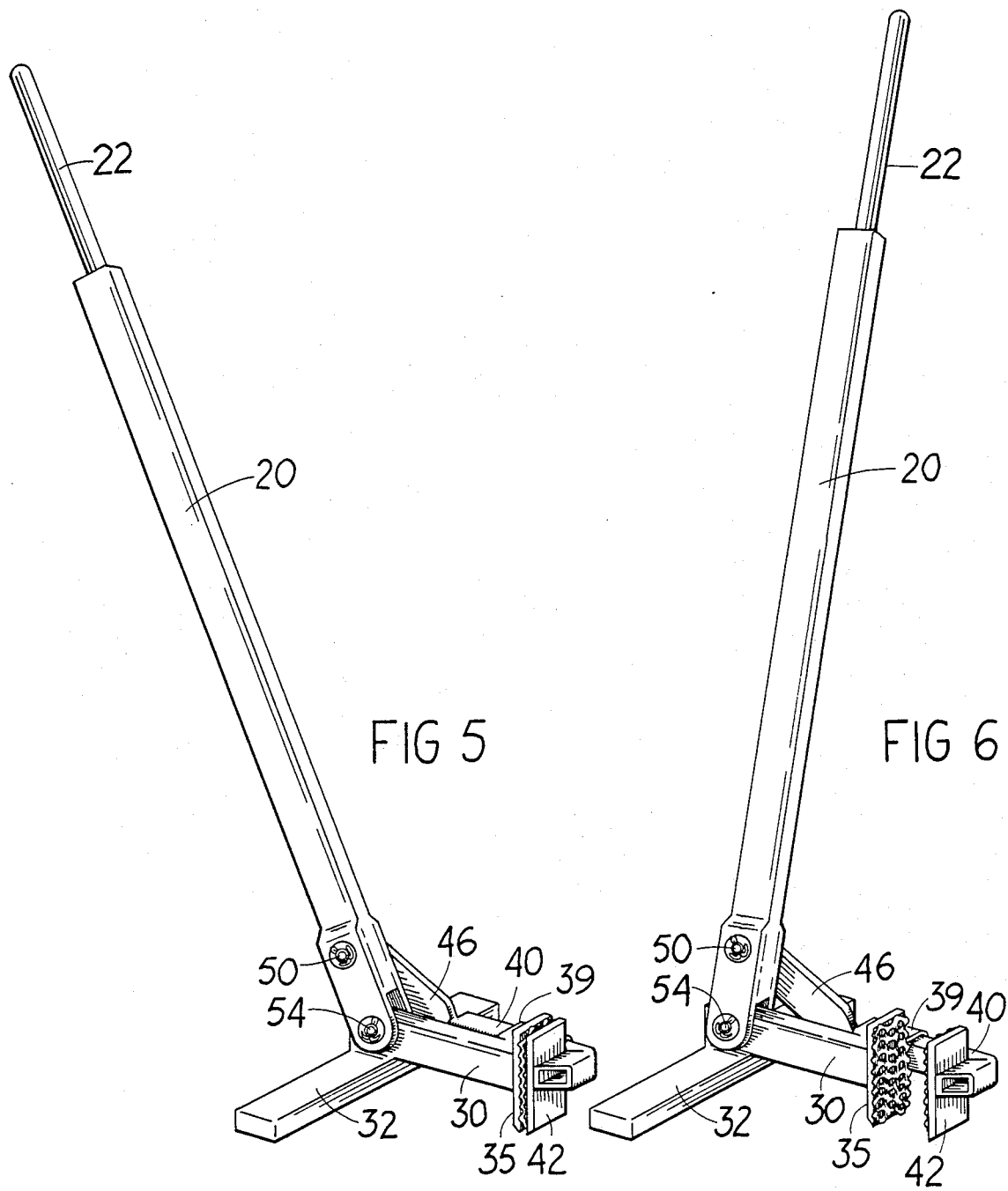

WOODY PLANT EXTRACTOR

BACKGROUND OF THE INVENTION

This invention relates to weeding tools, specifically to pulling devices for use in uprooting woody plants from the soil.

DESCRIPTION OF PRIOR ART

The rangers and volunteers who care for public park wildlands face an ongoing need to remove invading exotic shrubs and trees that disrupt the balanced ecosystem of native plant varieties. Homeowners, foresters, agriculturists, landscape workers and the like often need to permanently remove unwanted shrubs and small trees.

Heretofore, the problems of clearing young trees and woody shrubs from an area had involved back-breaking toil, using picks and shovels to uncover the roots, then pulling by hand or with the help of draft animals, or in more modern times, with tractors and winches. While this approach was effective, it was laborious and dangerous, it required considerable physical strength, and it disturbed a much larger area than the plant occupied.

Another approach was to cut the plant at the soil line using one of a variety of hand or fuel-powered blade tools, leaving the plant's root system intact beneath the surface. This left an area looking cleared with a minimum of disturbance to the surroundings, but soon new growth would appear from the old roots, and the plant would come back bushier and more difficult to remove than before. Furthermore, blade tools required strength and skill to use, and could be dangerous to the user and to others in the work area; fuel-powered tools had the additional disadvantages of severe danger for the user, noise, fumes and fire risk, as well as high purchase and maintenance costs.

A third approach was to use herbicides to kill the unwanted brush or small trees. A trained operator used expensive and potentially dangerous chemicals in a spraying apparatus to poison the target plant. The nearby desirable plants were often harmed by overspray of the herbicide. When the target plant was dead, there still remained the problem of extracting it. Many questions remain about the long-term effects of herbicides on humans, wild animals and the environment. Therefore, public park agencies and property owners have become reluctant to use chemical herbicides. Parks in particular use chemicals only as a last resort rather than provoke public outrage.

Most users, therefore, would find it desirable to have a tool which could grip an unwanted shrub or tree and uproot it completely, easily, and safely, without undue disturbance to neighboring vegetation, or harm to the user or to the environment.

OBJECTS AND ADVANTAGES

Accordingly I claim the following as the objects and advantages of my invention: to provide a tool for easily grasping and uprooting woody plants; to provide such a tool which can be effectively and safely operated by a person of ordinary physical strength and with little training or experience; to provide such a tool which acts selectively on the target plant with minimum disturbance to surrounding vegetation; to provide such a tool which extracts sufficient root to kill the plant, leaving no stump to re-sprout later; and to provide such a tool which requires no fuel or chemicals for its effective operation.

In addition I claim the following additional objects and advantages: to provide a tool which is easily hand-carried to the site of operation; to provide such a tool which requires little storage space and minimal maintenance.

Further objects and advantages of my invention will become apparent from a consideration of the drawings and ensuing description of it.

SUMMARY OF THE INVENTION

The gist of the present invention is a set of parallel stemgripping jaws pivotally connected to a lever arm. The tool of the invention can be used to grasp a woody plant stem and by pulling downward upon said lever arm, to apply a gripping and lifting force to the plant many times greater than that of the operator's downward pressure.

BRIEF DESCRIPTION OF DRAWINGS

FIG. 1 shows a perspective left rear view of a tool according to the invention, with lever arm forward and jaw faces parted.

FIG. 2 shows a detail left rear view of the lever arm assembly of such tool.

FIG. 3 shows a detail left rear view of the lifter arm assembly of such tool.

FIG. 4 shows a detail left rear view of the movable jaw assembly of such tool.

FIG. 5 shows a perspective right front view of such tool with lever arm back and jaw faces approximated.

FIG. 6 shows the same view of such tool as in FIG. 5, with lever arm forward and jaw faces parted.

Figure 7:
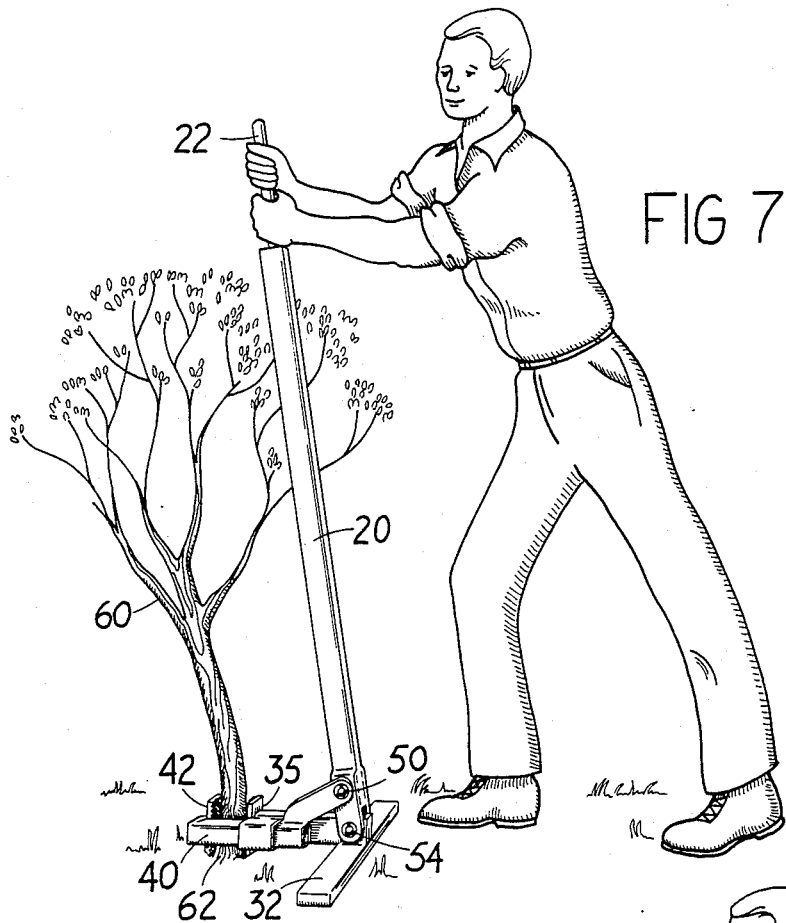
FIG. 7 shows a view of such tool in use grasping the base of a woody plant.

LIST OF REFERENCE NUMERALS 20 lever arm
22 grip handle for 20
23 upper end of 20
24 cheek plate
25 lower end of 20
26 flange
28 upper pivot hole
29 flange hole
30 lifter arm
31 rear end of 30
32 fulcrum
33 cut end of 32
34 end cover of 33
35 fixed jaw face
36 reinforcing plates
38 hole in 30
39 guide for 40
40 movable jaw
42 movable jaw face
44 short leg of 40
45 rear end of 40
46 connecting arm for 40
48 hole for 46
50 upper pivot pin
52 washer
53 cotter pin
54 lower pivot pin
60 woody plant

DESCRIPTION OF INVENTION

FIG. 1 shows a perspective left rear view of a tool according to the invention. FIGS. 5-6 show a perspective right front view of such tool. The tool in this embodiment of the invention is made of mild steel and comprises a lever arm assembly (FIG. 2), a lifter arm assembly (FIG. 3), and a movable jaw assembly (FIG. 4). The lever arm assembly, as shown in FIG. 2, comprises lever arm 20, which is 1"×2" rectangular tube about four feet long; grip handle 22, which is a 12-inch length of round tube flattened slightly at one end and welded into upper end 23 of lever arm 20; and two cheek plates 24, which are cut from flat bar, each being about 5 inches long with a rounded lower edge. These are welded to the 2" sides of lever arm 20 such that they extend past its lower end 25, forming two flanges 26. Upper pivot hole 28 is drilled at an upper pivot point, to receive upper pivot pin 50. Flange holes 29 are drilled at a lower pivot point on flange 26 to receive lower pivot pin 54.

The lifter arm assembly, as shown in FIG. 3, comprises lifter arm 30, which is 1"×2" rectangular tube about 9 inches long; and fulcrum 32, which is a 15-inch length of rectangular tube, its center being welded to the underside of lifter arm 30 at a right angle to it and flush with its rear end 31. The cut ends 33 of fulcrum 32 are sealed with fitted steel end covers 34 welded in place. Fixed jaw face 35 is a length of flat bar with a beveled lower edge, and with expanded steel mesh welded to its face to form a gripping surface (shown clearly in FIG. 6). Fixed jaw face 35 is welded to the front end of lifter arm 30 with its gripping surface forward. The rear end 31 of lifter arm 30 is internally reinforced with steel plates 36 welded in place, and drilled with hole 38 to receive lower pivot pin 54. Movable jaw guide 39 is a length of square tube welded to the side of lifter arm 30 such that its front end is flush with fixed jaw face 35.

Lifter arm 30 is joined to lever arm 20 at flanges 26 by means of pivot pin 54, which is steel rod cut to length, drilled and chamfered, such that it can pass through flange holes 29 and lifter arm hole 38, to be secured on each side by a washer 52, and by a cotter pin 53, as seen in FIG. 1 and FIGS. 5-6.

The movable jaw assembly, as shown in FIG. 4, comprises movable jaw 40, which is a 9-inch length of square tube with a short leg 44 welded to its front end at a 90° angle in a mitred joint; movable jaw face 42 (homologous to fixed jaw face 35), which is welded to short leg 44 of movable jaw 40 such that its gripping surface faces to the rear; and connecting arm 46, which is cut from flat bar with rounded ends, and welded to the upper side of movable jaw 40 at its rear end 45. Hole 48 is drilled at a pivot point in connecting arm 46 to receive upper pivot pin 50.

Movable jaw connecting arm 46 is joined to lever arm 20 at the upper pivot point by means of upper pivot pin 50, which is steel rod cut to length, drilled and chamfered such that it can pass through hole 28 and hole 48, to be secured on each side by a washer 52 and a cotter pin 53. In the finished tool, movable jaw 40 passes through guide 39, positioned such that movable jaw face 42 opposed fixed jaw face 35, best seen in FIG. 1. As shown in FIGS. 5-6, movable jaw 40 moves in parallel relation to lifter arm 30, jaw faces 35 and 42 remaining parallel to each other throughout the range of movement.

The dimensions specified in this description refer to a heavy-duty embodiment of the invention made of mild steel. Medium-duty and light-duty embodiments have been successfully made using proportionally smaller dimensions, engineered at the request of users who prefer a lighter tool according to their specific purposes.

OPERATION OF INVENTION the tool of FIGS. 1-6 will readily uproot woody shrubs and trees having a stem diameter at ground level of up to 2½ inches.

Figure 8:
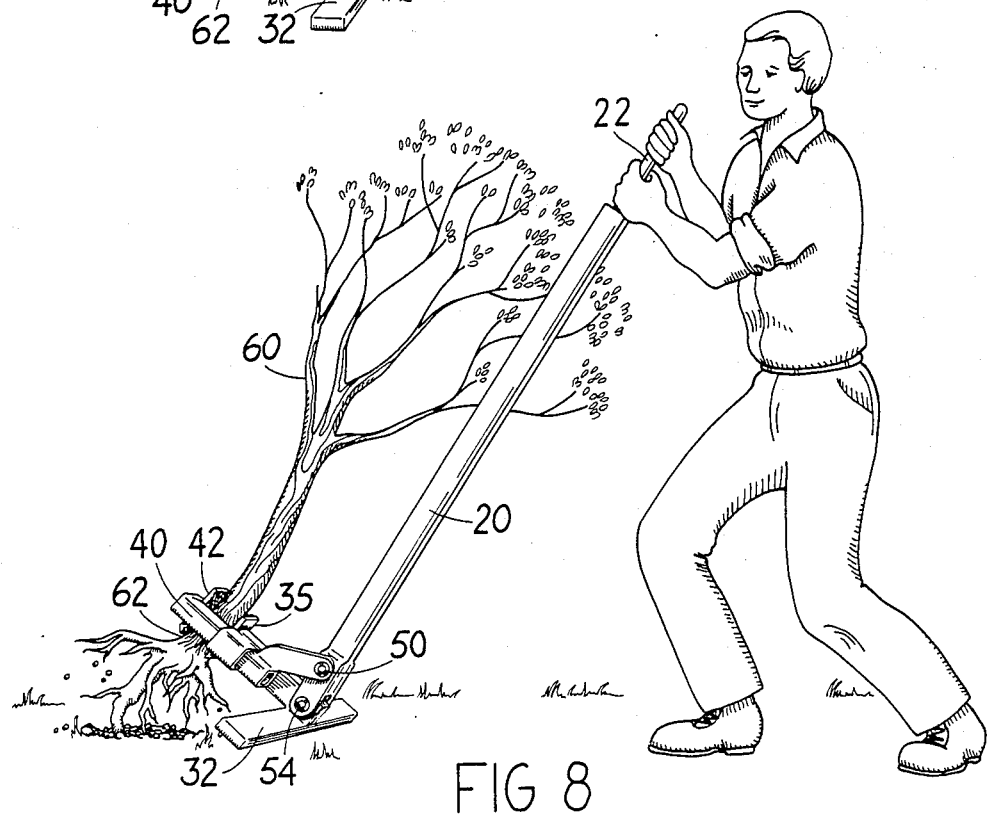
FIG. 8 shows a view of such tool in use uprooting such plant from the soil.

Referring now to FIG. 7, to uproot a woody plant 60, the user should grasp grip handle 22 and position the tool with fulcrum 32 resting on the ground such that jaw faces 35 and 42 are placed beside stem 62 of plant 60. The user should then push grip handle 22 forward, causing lever arm 20 to pivot forward on lower pivot pin 54, thus causing movable jaw 40 to shift forward on upper pivot pin 50. This action pushes movable jaw face 42 forward and away from fixed jaw face 35. With the jaw faces thus parted, the user should position the jaw faces around the base of stem 62 as shown in FIG. 7, such that stem 62 is centered between them, either by nudging the tool with the user's foot, or by briefly lifting and repositioning the tool using grip handle 22. The user should then pull back on grip handle 22, causing lever arm 20 to pivot toward the rear, pulling movable jaw 40 backward on the upper pivot pin. This action draws movable jaw face 42 back toward fixed jaw face 35, closing the jaw faces upon the plant stem and halting any further motion at the pivot pins. The user should then continue to pull back on grip handle 22. This causes lever arm 20 to rotate the lifter arm 30 assembly with fulcrum 32 at the axis of rotation. raising jaw faces 35 and 42 from the ground while increasing the gripping force of said jaw faces, thus uprooting the plant from the soil as seen in FIG. 8. The user may find that a series of vigorous pumping motions on grip handle 22 are more effective than one sustained pull, to progressively fracture the soil and release the plant's roots. Once the plant is uprooted, the user should push grip handle 22 forward against to part the jaw faces, thereby releasing the uprooted plant.

To uproot a shrub or tree which has previously been cut off at ground level, it is sometimes helpful for the user to drive jaw faces 35 and 42 beneath the soil line to gain a better grasp on the stub of the plant stem. To accomplish this, the user should bend down and grasp jaw faces 35 and 42, raking their beveled lower edges back and forth into the earth to seat them around the stub; then the user should proceed as described above to pull back on grip handle 22 to grasp the stub and uproot the plant.

The tool can also be used to unearth vertically emplaced rigid objects such as stakes or posts up to 2½ inches in diameter. To accomplish this, the user should position jaw faces 35 and 42 around the base of the object in the same manner as for a plant stem, then pull back on grip handle 22 to lift the object as far out of the ground as possible. The user should then push grip handle 22 forward to part the jaw faces, reposition the jaw faces around the object at the soil line, and pull back on grip handle 22 again. The user should repeat this process of grasping, pulling, and repositioning the jaw faces until the object is worked completely out of the ground.

While I have described the process of uprooting a woody plant with the tool of the invention in some detail, in practice I have found that it can be performed rapidly, usually in about ten to twenty seconds.

CONCLUSION AND SCOPE OF INVENTION

Thus the reader will see that the tool of the invention provides an effective means for uprooting woody plants that can be used safely and easily by anyone of ordinary physical strength.

While the foregoing description contains many specificities, the reader should not construe these as limitations on the scope of the invention, but merely as exemplifications of an early embodiment thereof. Those skilled in the art will envision other possible variations within the scope of the invention. For example, skilled artisans will readily be able to change the dimensions, shapes, and fabrication techniques of the various parts of the embodiment. In general, other embodiments may incorporate variations in four areas: lighter weight, higher strength, greater wear resistance, and other sizes.

Lighter weight and higher strength variations may take the form of replacing mild steel components with forged parts of steel or light alloys or the like. For example, lever arm 20 may be made in a truss assembly of high-strength alloy tubing or of a fiber composite material mated to a socket at the lower end. Jaw faces 35 and 42 may be made of forgings or castings with the gripping surfaces integrally formed in the metal rather than welded on separately.

Greater wear resistance may take the form of pivot pins 50 and 54 being formed of hardened steel. Further possibilities may include replaceable bushings, seals against entry of dirt, and the inclusion of grease fittings, all of which could serve to create a longer-lasting tool.

In addition to the three sizes previously described, a fourth and smaller size may be made for one-handed operation from a sitting or kneeling position. This size would fill a need for uprooting woody or fibrous plants up to ½ inch in stem diameter, which are often difficult to uproot by hand but would be conveniently uprooted by a smaller embodiment of the present invention. One-handed operation in such an embodiment could be facilitated by a hand lever at grip handle 22 linked by a connecting rod, control cable, or other suitable linkage to lifter arm 30 for holding the jaw open during placement around the stem.

Accordingly the scope of the invention should be determined not by the embodiment illustrated, but by the appended claims and their legal equivalents.

What is claimed as new is:

1. A tool for removing a woody plant or other rigid, vertically emplaced object from the ground, comprising:
   (a) an elongated lever means, having a lower pivot point and an upper pivot point, both situated at its lower end,
   (b) a lifter arm means, the rear end thereof being pivotally attached to said lever means at said lower pivot point,
   (c) said lifter arm means having a fixed jaw face means at its front end,
   (d) a fulcrum means, being positioned under said lifter arm means at its rear end,
   (e) a movable jaw means, being pivotally attached to said lever means at said upper pivot point,
   (f) a guide means whereby said movable jaw means is retained in parallel relation to said lifter arm means,
   (g) a movable jaw face means, being positioned on said movable jaw means at its front end and oriented toward the rear so as to oppose and approximate said fixed jaw face means, in parallel relation thereto.

2. The invention of claim 1 wherein a handle means is affixed to the upper end of said lever means.

3. The invention of claim 1 wherein a gripping surface texturing means is applied to the faces of said fixed jaw face means and said movable jaw face means.

* * * * *